United States Patent
Shaffer et al.

[11] Patent Number: 5,999,599
[45] Date of Patent: Dec. 7, 1999

[54] SYSTEM AND METHOD FOR ENHANCED CALLER NAME ALERTING

[75] Inventors: Shmuel Shaffer, Palo Alto; William J. Beyda, Cupertino, both of Calif.

[73] Assignee: Siemens Information and Communication Networks, Inc., Boca Raton, Fla.

[21] Appl. No.: 09/118,563

[22] Filed: Jul. 17, 1998

[51] Int. Cl.⁶ .................................................. H04M 11/00
[52] U.S. Cl. ................... 379/93.23; 379/142; 379/88.21
[58] Field of Search ............................... 379/93.17–93.19, 379/93.23, 93.26–93.28, 110.01, 142, 88.19, 88.21

[56] References Cited

U.S. PATENT DOCUMENTS

| | | | |
|---|---|---|---|
| 4,427,847 | 1/1984 | Hofmann et al. | 179/2 TV |
| 4,899,358 | 2/1990 | Blakley | 379/67 |
| 5,046,079 | 9/1991 | Hashimoto . | |
| 5,274,699 | 12/1993 | Ranz | 379/142 |
| 5,521,969 | 5/1996 | Paulus et al. | 379/142 |
| 5,526,406 | 6/1996 | Luneau | 379/61 |
| 5,530,741 | 6/1996 | Rubin | 379/142 |
| 5,559,868 | 9/1996 | Blonder | 379/93.23 |
| 5,659,602 | 8/1997 | Gay | 379/142 |
| 5,668,852 | 9/1997 | Holmes | 405/31.2 |
| 5,689,551 | 11/1997 | Rudd | 379/142 |
| 5,703,934 | 12/1997 | Zicker et al. | 379/61 |
| 5,724,412 | 3/1998 | Srinivasan | 379/93.23 |
| 5,761,279 | 6/1998 | Bierman et al. | 379/93.23 |
| 5,850,435 | 12/1998 | Devillier | 379/142 |
| 5,883,943 | 3/1999 | Siddiqui | 379/142 |
| 5,889,852 | 3/1999 | Rosecrans et al. | 379/93.23 |

FOREIGN PATENT DOCUMENTS

| | | | |
|---|---|---|---|
| 2618281 | 1/1989 | France | 379/142 |
| 62-188539 | 8/1987 | Japan | 379/142 |
| 2-113657 | 4/1990 | Japan | 379/53 |

Primary Examiner—Wing F. Chan

[57] ABSTRACT

An embodiment of the present invention provides an audio message, such as the identification of a caller, without requiring pre-recording by the call receiver, and providing the audio message in the caller's own voice, if they so desire. According to an embodiment of the present invention, a caller may record her identification prior to making a telephone call. The recorded identification would be sent along with each call the caller makes. The caller's recorded identification would be received by the receiver and announced to the receiver. The caller may also record an image to be sent along with her calls such that the receiver of her call may see her recorded image displayed when her call is being announced. Accordingly, an embodiment of the present invention allows identification of first-time callers and infrequent callers without the need for the call receiver to pre-record the caller's identity.

32 Claims, 7 Drawing Sheets

SYSTEM AND METHOD FOR ENHANCED CALLER NAME ALERTING

FIELD OF THE INVENTION

The present invention relates to caller name alerting. In particular, the present invention relates to a system and method for alerting a receiver of a caller's identity by announcing the caller's identification information.

BACKGROUND OF THE INVENTION

Telephone communication is increasingly becoming more important in the modern world. In order to accommodate frequent uses of telephone communication, a user may often prefer to know a caller's identity prior to answering the call. A receiver of a telephone call may employ devices which display caller identification and may even announce a caller's name or phone number. For example, one of these devices may announce that "Bob Jones is calling". The name "Bob Jones" is typically stored in a database at the call receiver's location as an audio file. The audio file is typically pre-recorded by the call receiver. The call receiver may identify a telephone number and record a name associated with the telephone number such that when a call that originated from the recorded telephone number is received, the recording associated with the telephone number may be announced or displayed.

A problem may arise when a caller calls a call receiver for the first time. The call receiver most likely has not yet recorded the identity of this new caller and will not have the caller's identification displayed or announced. Alternatively, a caller may be an infrequent caller. A call receiver may not take the time to record caller identification information for an infrequent caller and yet may desire the caller to be identified.

Another option for the call receiver is to employ some devices which may perform number to speech conversion, such as "seven-two-three-one-five-eight-seven is calling". Number to speech conversions allow a call receiver to know who is calling without the need for easy access to a display. Number to speech conversions also allow a call receiver to know who is calling without pre-recording the identity of the caller. Even though the number to speech conversion may identify the phone number of the caller, it is often difficult for many people to recognize and associate a phone number with an individual.

It would be desirable to have a system and method that allows easy identification of a caller without requiring the call receiver to have previously identified the caller and pre-recorded the caller's identity. It would also be desirable to announce a name or display an image without the call receiver first having to record an association of the caller with a phone number. The present invention addresses such a need.

SUMMARY OF THE INVENTION

An embodiment of the present invention provides an audio message, such as the identification of a caller, without requiring pre-recording by the call receiver, and providing the audio message in the caller's own voice, if they so desire. According to an embodiment of the present invention, a caller may record her identification prior to making a telephone call. The recorded identification would be sent along with each call the caller makes. The caller's recorded identification would be received by the receiver and announced to the receiver. The caller may also record an image to be sent along with her calls such that the receiver of her call may see her recorded image displayed when her call is being announced. Accordingly, an embodiment of the present invention allows identification of first-time callers and infrequent callers without the need for the call receiver to pre-record the caller's identity.

A method according to an embodiment of the present invention for identifying a telecommunication caller is presented. The method comprising steps of recording an identifying information of a telecommunication caller; saving the recording; and sending the recording along with a telecommunication call to a receiving location.

In another aspect of the present invention, a system according to an embodiment of the present invention for identifying a telecommunication caller is presented. The system comprising a recording device configured to store an identifying information of a telecommunication caller; a memory coupled to the recording device for saving the recording; and a network interface coupled to the memory, the network interface being able to send the recording along with a telecommunication call to a receiving location.

In yet another aspect of the present invention, another system according to an embodiment of the present invention for identifying a telecommunication caller is presented. The system comprising a network interface configured to receive a recording of an identifying information which is received along with a telecommunication call, a processor coupled with the network interface for playing the recording; and a speaker coupled with the processor for announcing the identifying information.

DETAILED DESCRIPTION OF THE PREFERRED EMBODIMENTS

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiments shown but is to be accorded the widest scope consistent with the principles and features described herein.

For simplicity, the examples herein refer to a telephone caller, however, embodiments of the present invention are not limited to a caller using a telephone. Rather, the caller may be any telecommunication caller. A telecommunication caller is herein meant to include a caller using a telephone, a cellular phone, a computer system, a video conferencing system, or any other voice or image communication means. Additionally, the caller is not limited to a person. A caller may be any entity, or device or program representing an entity, that can cause a telecommunication call to occur. Further, although a name and an image of the caller are used herein as examples, a caller identification may also include a symbol, such as a company logo, a slogan, or any other identifying audio or image.

Figure 1A:
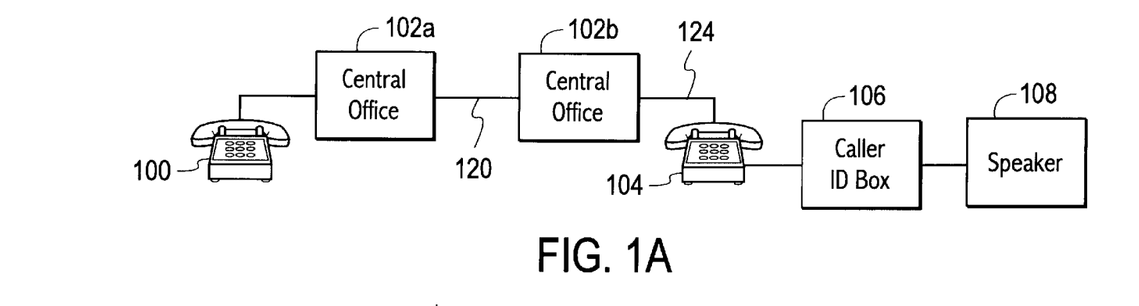
FIGS. 1A–1C are block diagrams of a telephony system which is suitable for implementing the present invention.
Figure 1B:
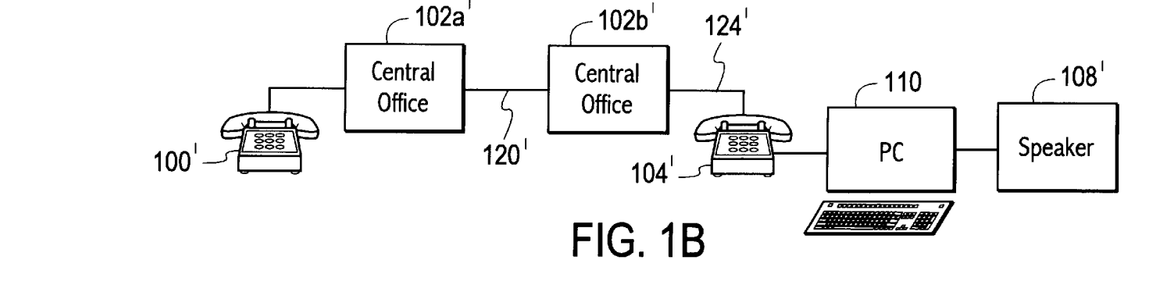
Figure 1C:
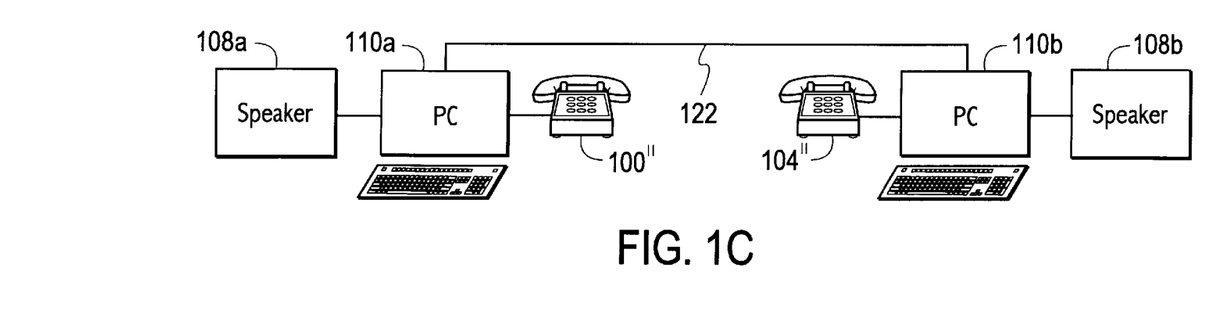

FIGS. 1A–1C are block diagrams illustrating a telephony system suitable for implementing embodiments of the present invention. FIG. 1A is a telephony system including a calling telephone 100 coupled to a sender's central office 102A which in turn is coupled to a receiving central office 102B. The receiving central office 102B is coupled to a receiving telephone 104. The receiving telephone 104 is also shown to be coupled to a caller identification (ID) box 106 and a speaker 108. Caller ID box is optional depending on the capability of receiving telephone 104. Details of caller ID box 106 will later be discussed in conjunction with FIG. 6.

Calling telephone 100 and receiving telephone 104 may be either analog or digital telephones. Details of a digital telephone suitable for implementing embodiments of the present invention will later be discussed in conjunction with FIG. 5. Central offices 102A and 102B may provide the service of routing telephone calls. Examples of companies which provide such service include GTE and Pacific Bell. The coupling between sender's central office 102A and receiver's central office 102B may be a network connection, such as a wide area network (WAN). A connection 124 between receiver's central office 102B and receiving telephone 104 may send an analog caller identification signal if receiving telephone 104 is an analog phone, or a D channel signal if receiving phone 104 is a digital telephone.

FIG. 1B shows a similar system to that show in FIG. 1A. However, receiving telephone 104' is shown to be coupled with a computer 110 and a speaker 108'. Further details of a computer suitable for implementing the present invention will later be discussed in conjunction with FIG. 7. Although the example shown in FIG. 1B includes receiving telephone 104', computer 110 (used with a modem, not shown) may be configured to serve the function of receiving telephone 104'. An example of a program which would configure computer 110 to serve such of function is MegaPhone by Cypress Research Corporation of Santa Clara, Calif.

This system shown in FIG. 1C is an example of telephony over a local area network (LAN) (TOL)system. A sending telephone 100" is shown to be coupled to a sending computer 110A and a speaker 108A. The sending telephone 100" is shown to be coupled by a LAN connection 122 to a receiving telephone 104". The receiving telephone is also shown to be coupled with a receiving computer 110B and a speaker 108B. Although the example shown in FIG. 1C includes telephones 100" and 104", computers 110A and 110B may be configured to serve the function of telephones 100" and 104".

Figure 2:
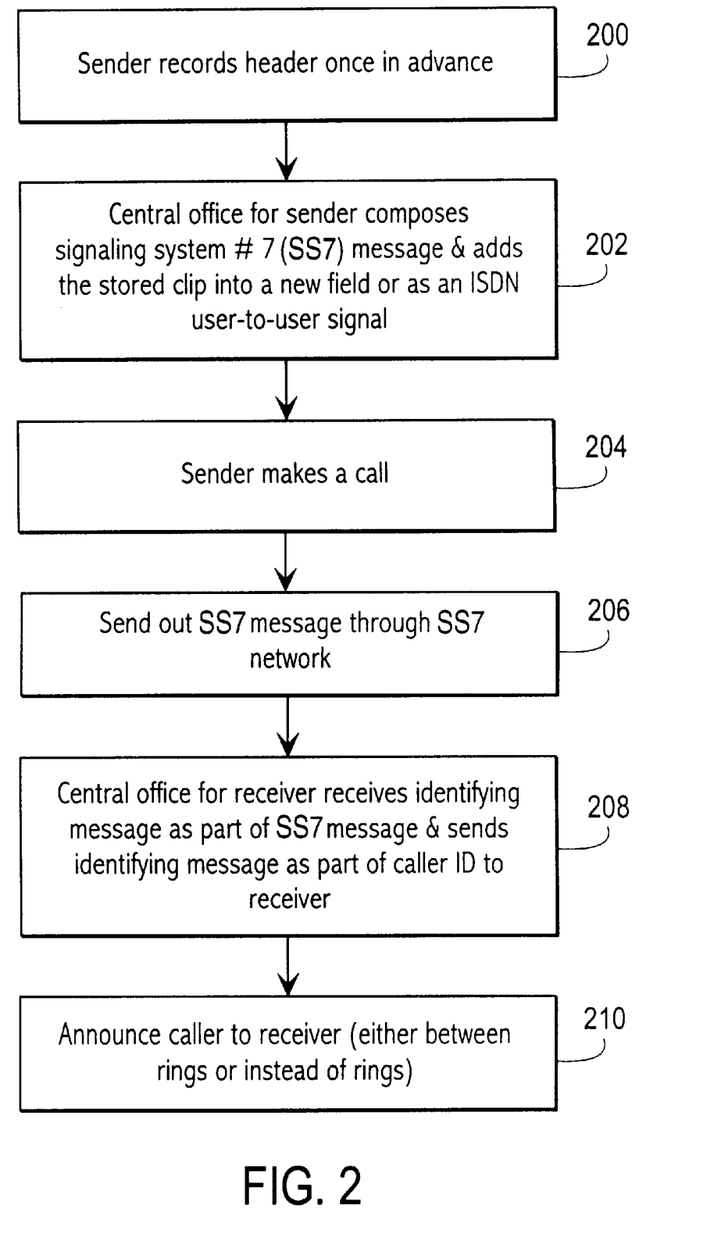
FIG. 2 is a flow diagram of a method according to an embodiment of the present invention for caller identification alerting.

FIG. 2 is flow diagram of a method according to an embodiment of the present invention for caller identification alerting. A sender records a header in advance (step 200). For example, the sender may record an audio file of the sender's name. Another option is for the sender to record an image of herself either in addition to or in place of an audio file.

The stored clip recorded by the sender may be stored at a third party location, such as the sender's central office's location. In this example, sender's central office 102a and 102a' (of FIGS. 1A and 1B) then composes a signaling system number 7 (SS7) message and adds the stored recorded clip into a new field. Alternatively, the stored recorded clip may be sent as an integrated services digital network (ISDN) user-to-user signal (step 202). The stored recorded clip may also be sent as part of an ISDN network signal in a call request packet.

Signaling system number 7 is a protocol used by telephone networks between central offices or between toll offices. Signaling system number 7 protocol is defined by International Telecommunications Union (ITU) standards and is well known to those reasonably skilled in the art.

An ISDN user-to-user signal may be sent from sender's central office 102a–102a' to receiver's central office 102b–102b' without any central office or station accessing this information. An ISDN user-to-user signal is typically a blank field used for various purposes, such as proprietary signaling. It is typically ignored by the rest of the network. If the receiver does not have the capability to deal with the ISDN user-to-user signal, then it may simply be ignored. The ISDN user-to-user signal protocol is also defined by ITU standards and is well known to those reasonably skilled in the art.

Although SS7 is used in this example, any message protocol which can include an additional field for the recorded header may be used in accordance with the present invention. Additionally, although central offices are used in the examples herein, private branch exchanges (PBX), which is an interface for telephones, terminals, and other equipment, may also be used instead of central offices.

The sender then makes a telephone call (step 204). The composed SS7 message is then sent out through a network capable of facilitating telephone calls, such as an SS7 network (step 206). Receiving central office 102b–102b' (of FIGS. 1A–1B) then receives the identifying message as part of the SS7 message and sends the identifying message as part of its normal caller ID (ID of telephone number of the caller) message to the receiving telephone (step 208). The caller is then announced to the receiver (step 210). The caller announcement is the header recorded by the sender in step 200. The caller may be announced prior to establishing two way communication, such as either between telephone rings or instead of the telephone rings. If an image was recorded by the sender, then the image can be displayed while the caller is being announced and/or while the telephone is ringing.

Figure 3:
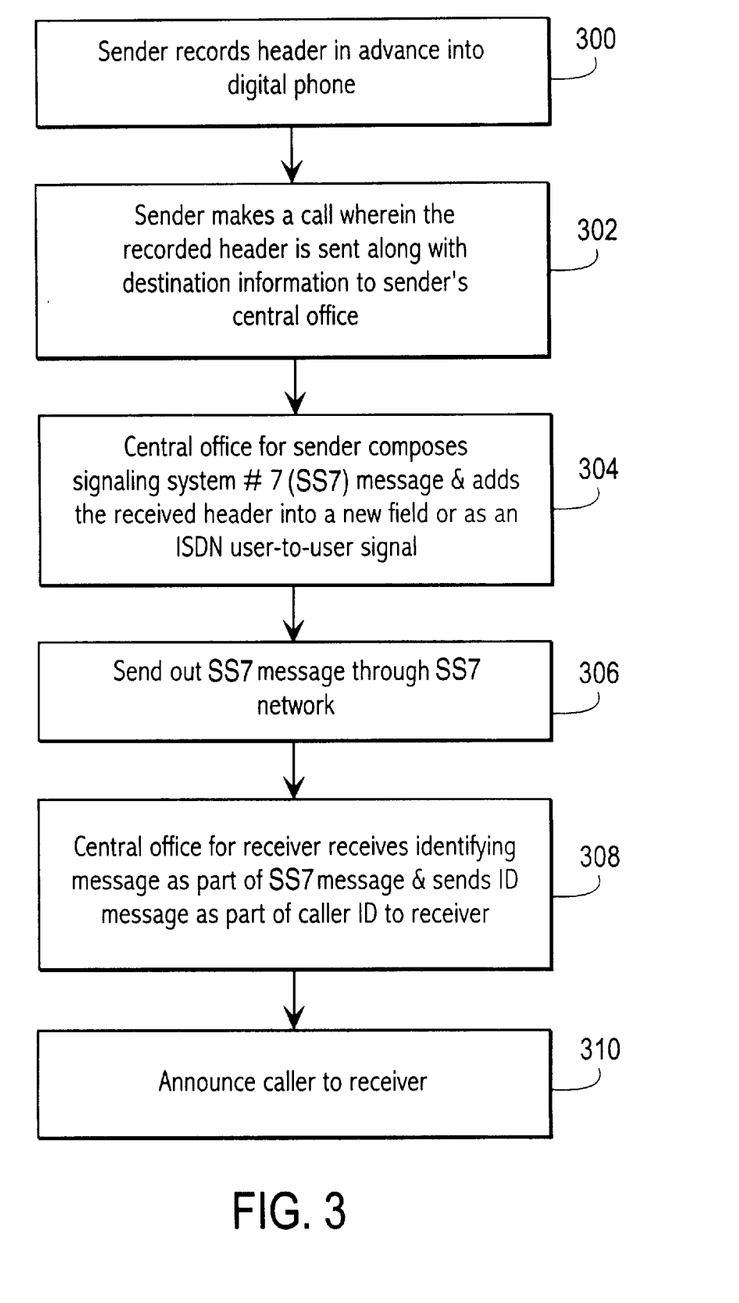
FIG. 3 is a flow diagram of a method according to a second embodiment of the present invention for caller identification alerting.

FIG. 3 is a flow diagram of a method according to second embodiment of the present invention for caller identification alerting. In this method, the sender records the identifying information into a digital phone which stores the information in a memory (step 300). The sender then makes a call wherein the recorded header is sent along with destination information to the sender's central office 102a–102a' (step 302). The sender's central office 102a–102a' then composes a signaling system 7 (SS7) message and adds the received header into a new field. Alternatively, the recorded header is sent as an ISDN user-to-user signal (step 304). The SS7 message is then sent out through a network capable of facilitating a telephone call, such as an SS7 network (306). Receiver's central office 102b–102b' then receives the identifying message as part of the SS7 message and sends the ID message as part of its normal caller ID (ID of telephone number of the caller) message to the receiver (step 308). The recorded caller announcement is then announced to the receiver (step 310).

Figure 4:
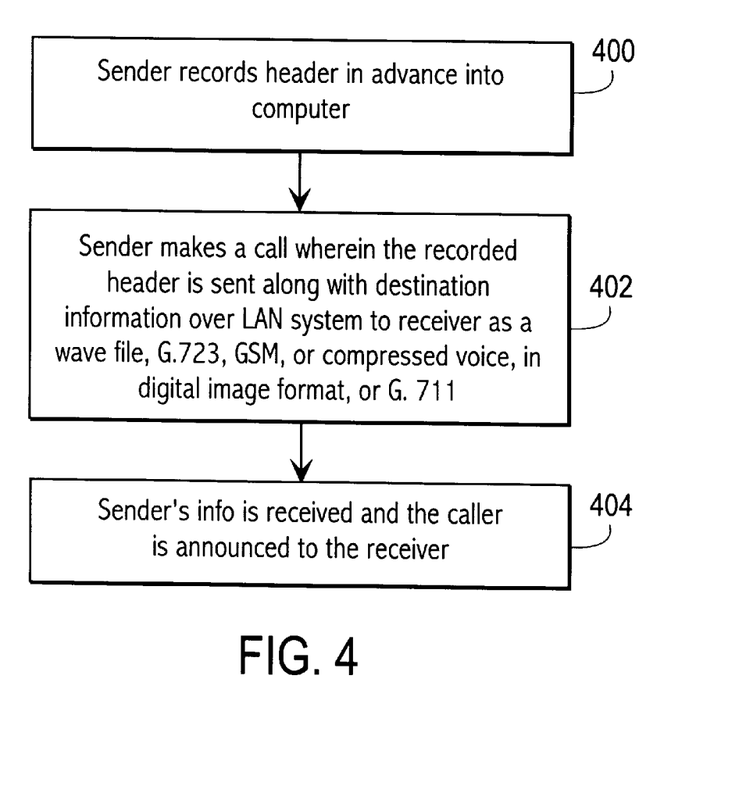
FIG. 4 is a method according to a third embodiment of the present invention for caller identification alerting.

FIG. 4 is a flow diagram of a method according to a third embodiment of the present invention for caller identification alerting. The method shown in FIG. 4 may work in conjunction with the system shown in FIG. 1C. The method shown in FIG. 4 applies to a telephony over a local area network (LAN)(TOL). The sender initially records a header in advance into a computer, such as computer 110*a* of FIG. 1C (step 400). The sender then makes a call wherein the recorded header is sent along with destination information over the LAN system to the receiver (step 402). The recorded header may be sent in a digital audio format, such as a Wave file, a Global System for Mobil Communications (GSM) stream, a G.711 stream, or G.723 stream. It may also be sent as a digital image format, such as an H.261 video picture. Protocols for the digital formats such as G.711, H.261, and G.723 are defined by International Telecommunications Union (ITU), while protocol for GSM is defined by European Telecommunication Standards Institute. The protocols for these digital audio and image formats are well known to those reasonably skilled in the art.

The sender's information is then received by the receiver's computer, such as computer 110*b*, and the caller is announced to the receiver (step 404).

In all of the embodiments disclosed herein, the caller need only record the information (header) once, unless she desires to change the information. Thereafter, the recorded information may automatically be included with her calls.

Figure 5:
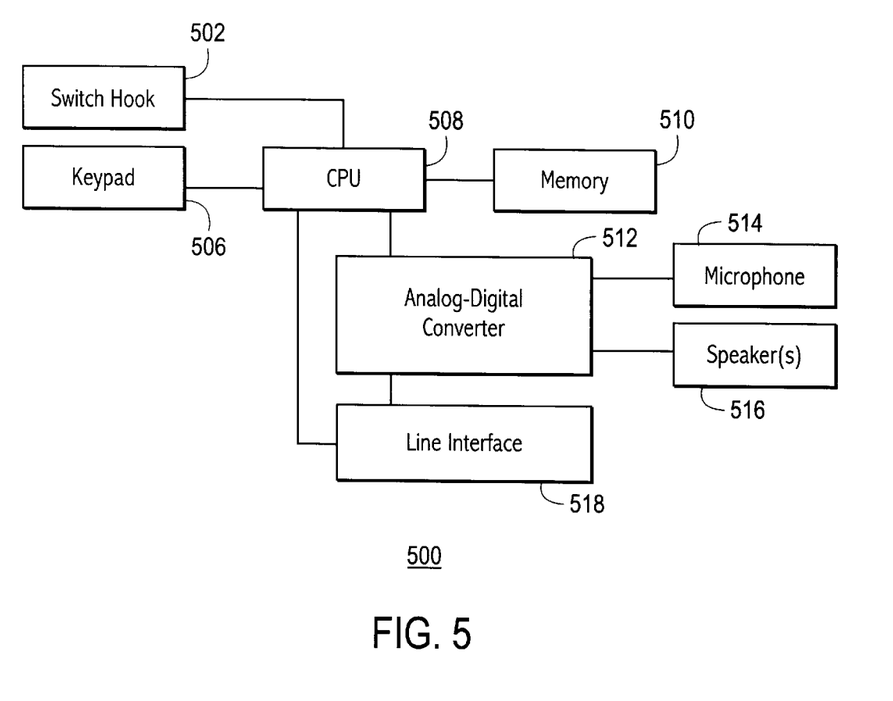
FIG. 5 is a block diagram of a digital phone suitable for implementing an embodiment of the present invention.

FIG. 5 is a block diagram of a digital telephone suitable for implementing an embodiment of the present invention, such as the method according to the second embodiment, as shown in FIG. 3. The digital phone 500 of FIG. 5 is shown to include a central processing unit (CPU) 508. CPU 508 is shown to be coupled with a switch hook 502 and a keypad 506. Switch hook 502 serves the function of connecting a call or hanging up a call. Keypad 506 serves the function of allowing a user to input alphanumeric input into digital phone 500. CPU 508 is also shown to be coupled with memory 510 which may store the identifying information recorded by the sender. CPU 508 is also shown to be coupled to an analog-digital converter 512 which serves the function of converting analog data into digital data. The analog-digital converter is also coupled to a microphone 514 and a speaker 516. Analog-digital converter 512 is also shown to be coupled to a line interface 518 which analyzes incoming channels and separates incoming signals from voice signals. Line interface 518 is also shown to be coupled to CPU 508.

Figure 6:
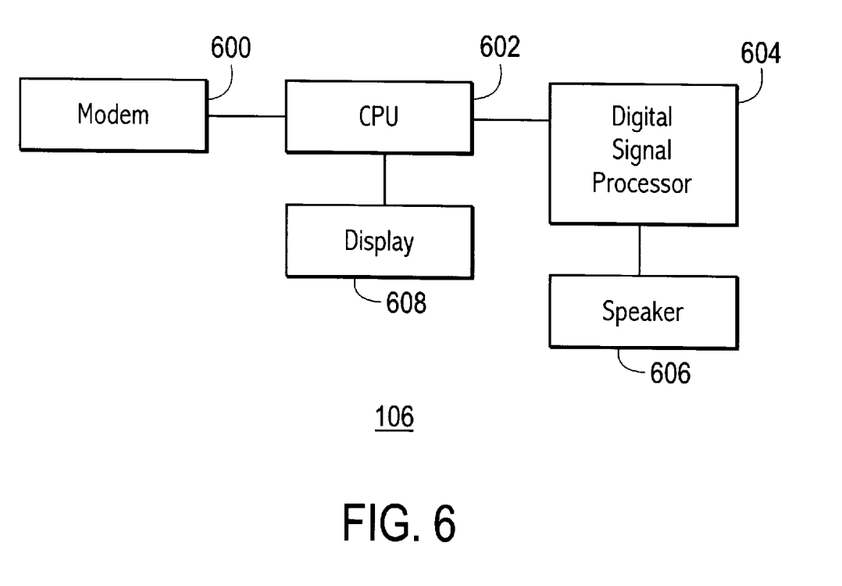
FIG. 6 is a block diagram of a caller identification box suitable for implementing an embodiment of the present invention.

FIG. 6 is a block diagram of a caller ID box, such as the optional caller ID box 106 shown in FIG. 1. The system shown in FIG. 1A may be used with a caller ID box 106 or a speaker phone. Some caller ID boxes are already configured to announce who is calling, but typically only by using number to speech conversion or headers recorded by the call receiver. A caller ID box working in conjunction with a telephone or a computer, in accordance with an embodiment of the present invention, would be configured to announce a header recorded by the caller.

Caller ID box 106 of FIG. 6 is shown to include a CPU 602 coupled with a modem 600 and a display 608. CPU 602 is also shown to be coupled with a digital signal processor 604 for decoding the digital header. Information can then be announced on the speaker 606 which is coupled to digital to analog converter 604. If caller ID box 106 is coupled with a digital line or integrated in a digital phone, modem 600 is replaced with decoder circuitry.

Figure 7:
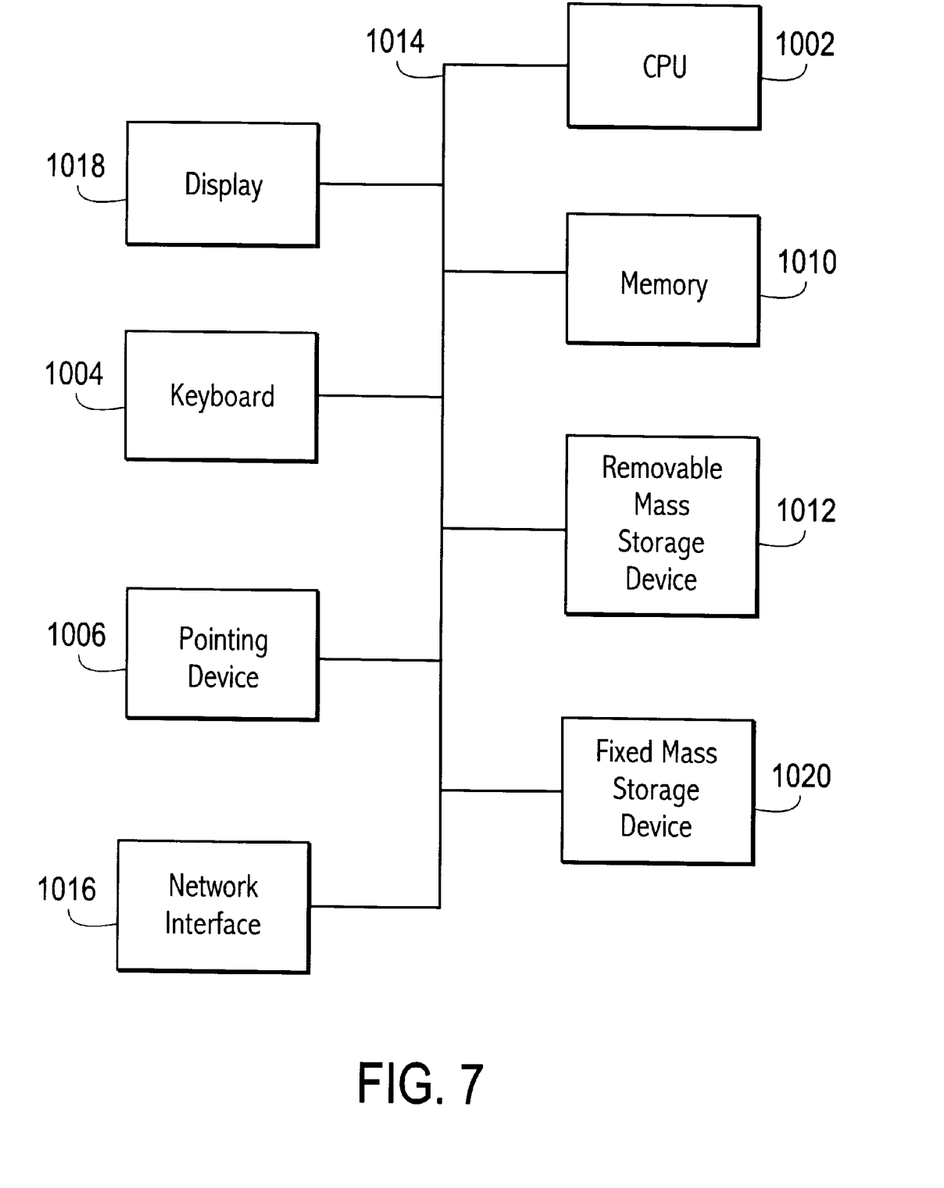
FIG. 7 is block diagram of a computer system suitable for implementing an embodiment of the present invention.

FIG. 7 is a block diagram of a general purpose computer system suitable for implementing the present invention. FIG. 7 illustrates one embodiment of a general purpose computer system. Other computer system architectures and configurations can be used for carrying out the processing of the present invention. Computer system 1000, made up of various subsystems described below, includes at least one microprocessor subsystem (also referred to as a central processing unit, or CPU) 1002. That is, CPU 1002 can be implemented by a single-chip processor or by multiple processors. CPU 1002 is a general purpose digital processor which controls the operation of the computer system 1000. Using instructions retrieved from memory 1010, the CPU 1002 controls the reception and manipulation of input data, and the output and display of data on output devices.

CPU 1002 is coupled bi-directionally with memory 1010 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 1002. Also as well known in the art, primary storage typically includes basic operating instructions, program code, data and objects used by the CPU 1002 to perform its functions. Primary storage devices 1010 may include any suitable computer-readable storage media, described below, depending on whether, for example, data access needs to be bi-directional or uni-directional. CPU 1002 can also directly and very rapidly retrieve and store frequently needed data in a cache memory (not shown).

A removable mass storage device 1012 provides additional data storage capacity for the computer system 1000, and is coupled either bi-directionally or uni-directionally to CPU 1002. For example, a specific removable mass storage device commonly known as a CD-ROM typically passes data uni-directionally to the CPU 1002, whereas a floppy disk can pass data bi-directionally to the CPU 1002. Storage 1012 may also include computer-readable media such as magnetic tape, flash memory, signals embodied on a carrier wave, PC-CARDS, portable mass storage devices, holographic storage devices, and other storage devices. A fixed mass storage 1020 can also provide additional data storage capacity. The most common example of mass storage 1020 is a hard disk drive. Mass storage 1012, 1020 generally store additional programming instructions, data, and the like that typically are not in active use by the CPU 1002. It will be appreciated that the information retained within mass storage 1012, 1020 may be incorporated, if needed, in standard fashion as part of primary storage 1010 (e.g. RAM) as virtual memory.

In addition to providing CPU 1002 access to storage subsystems, bus 1014 can be used to provide access other subsystems and devices as well. In the described embodiment, these can include a display monitor 1018, a network interface 1016, a keyboard 1004, and a pointing device 1006, as well as an auxiliary input/output device interface, a sound card, speakers, and other subsystems as needed. The pointing device 1006 may be a mouse, stylus, track ball, or tablet, and is useful for interacting with a graphical user interface.

The network interface 1016 allows CPU 1002 to be coupled to another computer, computer network, or telecommunications network using a network connection as shown. Through the network interface 1016, it is contemplated that the CPU 1002 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 1002 can be used to connect the computer system 1000 to an external network and transfer data according to standard protocols. That is, method embodiments of the present invention may execute solely upon CPU 1002, or may be performed across a network such as the Internet, intranet networks, or local area networks, in conjunction with a remote CPU that shares a portion of the processing. Additional mass storage devices (not shown) may also be connected to CPU 1002 through network interface 1016.

An auxiliary I/O device interface (not shown) can be used in conjunction with computer system 1000. The auxiliary I/O device interface can include general and customized interfaces that allow the CPU 1002 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, bus 1014 is illustrative of any interconnection scheme serving to link the subsystems. The computer system shown in FIG. 7 is but an example of a computer system suitable for use with the invention. Other computer architectures having different configurations of subsystems may also be utilized.

Although the present invention has been described in accordance with the embodiment shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed is:

1. A method for identifying a telecommunication caller, the method comprising:

recording an identifying information of the telecommunication caller by the telecommunication caller prior to placing a telecommunication call;

saving the identifying information as a file selected from the group consisting of an audio file, an image file, and an audio and image file; and sending the identifying information along with each telecommunication call to a receiving location.

2. The method of claim 1, further comprising playing the identifying information at the receiving location.

3. The method of claim 2, wherein the identifying information is played prior to establishing two way communication.

4. The method of claim 1, wherein the identifying information is sent as an audio file.

5. The method of claim 1, wherein the identifying information is a digital audio stream.

6. The method of claim 1, wherein the identifying information is an image.

7. The method of claim 1, wherein the identifying information is sent as part of a signaling system 7 message.

8. The method of claim 1, wherein the identifying information is sent as part of an ISDN user-to-user signal.

9. The method of claim 1, wherein the identifying information is sent as a Wave file.

10. The method of claim 1, wherein the identifying information is sent as a compressed voice file.

11. The method of claim 1, wherein the identifying information is sent as part of a call request packet.

12. The method of claim 1, wherein the identifying information is sent in GSM audio format.

13. The method of claim 1, wherein the identifying information is sent in G.723 audio format.

14. The method of claim 1, wherein the identifying information is sent in G.711 audio format.

15. The method of claim 1, wherein the identifying information is sent as an H.261 video picture.

16. The method of claim 1, wherein the identifying information is saved in a digital telephone.

17. The method of claim 1, wherein the identifying information is saved in a computer.

18. The method of claim 1, wherein the identifying information is saved at a third party location.

19. A system for identifying a telecommunication caller, the system comprising:

means for recording an identifying information of a telecommunication caller by the telecommunication caller prior to placing a telecommunication call;

means for saving the identifying information as a file selected from the group consisting of an audio file, an image file, and an audio and image file; and means for sending the identifying information along with each telecommunication call to a receiving location.

20. The system of claim 19, wherein the identifying information is a digital audio stream.

21. The system of claim 19, wherein the identifying information is an image.

22. A system for identifying a telecommunication caller, the system comprising:

a recording device configured to record an identifying information of the telecommunication caller by the telecommunication caller prior to placing a telecommunication call and to store the identifying information of the telecommunication caller;

a memory coupled to the recording device for saving the identifying information as a file selected from the group consisting of an audio file, an image file, and an audio and image file; and a network interface coupled to the memory, the network interface being able to send the recording along with each telecommunication call to a receiving location.

23. The system of claim 22, wherein the identifying information is a digital audio stream.

24. The system of claim 22, wherein the identifying information is an image.

25. A system for identifying a telecommunication caller, the system comprising:

a network interface configured to receive a recording of an identifying information which is received along with a telecommunication call, the identifying information being recorded by the telecommunication caller prior to placing a telecommunication call and saved as a file selected from the group consisting of an audio file, an image file, and an audio and image file; and a processor coupled with the network interface for playing the recording.

26. The system of claim 25, further including a speaker coupled with the processor for announcing the identifying information.

27. The system of claim 25, wherein the identifying information is a digital audio stream.

28. The system of claim 25, further including a display coupled with the processor for displaying the identifying information.

29. The system of claim 25, wherein the recording is an image.

30. A method for providing identifying information corresponding to a caller, the identifying information being for identifying the caller to a receiver of a transmission generated by the caller, the method comprising:

prior to sending the transmission, recording the identifying information by the caller;

incorporating the identifying information saved as a file selected from the group consisting of an audio file, an image file, and an audio and image file into the transmission; and sending the transmission to the receiver.

31. A computer program product for identifying a telecommunication caller, the program comprising:

computer code recording an identifying information of a telecommunication caller by the telecommunication caller prior to placing a telecommunication call;

computer code saving the identifying information as a file selected from the group consisting of an audio file, an image file, and an audio and image file;

computer code sending the identifying information along with each telecommunication call to a receiving location; and a computer readable medium that stores the computer codes.

32. The computer program product of claim 31, wherein the computer readable medium is selected from the group consisting of CD-ROM, floppy disk, tape, flash memory, system memory, hard drive, and data signal embodied in a carrier wave.

* * * * *